June 28, 1955     M. AUWARTER     2,712,097
HIGH VACUUM MEASURING DEVICE
Filed April 7, 1951
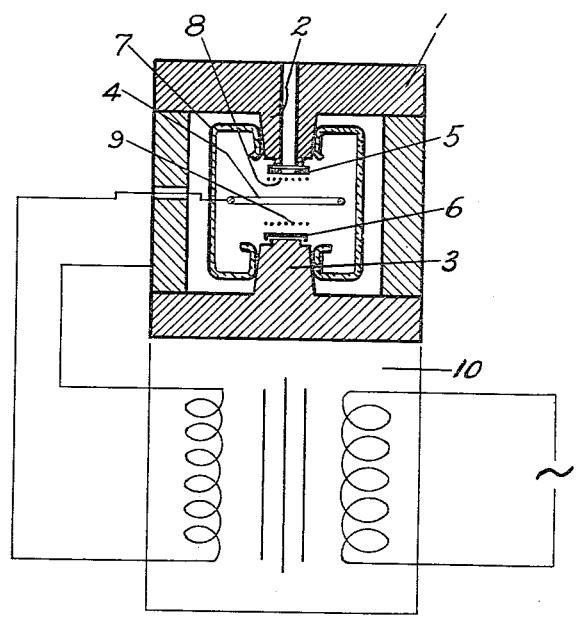
The Inventor:
Max Auwarter 2,712,097

HIGH VACUUM MEASURING DEVICE

Max Auwarter, Balzers, Liechtenstein

Application April 7, 1951, Serial No. 219,885

Claims priority, application Germany April 11, 1950

5 Claims. (Cl. 315—111)

The present invention relates to a device for the measurement of high vacua.

The known vacuum measuring devices, insofar as they utilize the measuring principle explained hereinbelow, operate very unreliably, and for the most part fail in the pressure range of $1 \times 10^{-5}$ to $6 \times 10^{-5}$ mm. Hg which, from the technical standpoint, is of the greatest importance. The known constructions of this type, furthermore, always require the use of high tension direct current. Direct current high tension generating plants are however very bulky and require a space which is greater than that which is available in the combination of measuring devices with industrial vacuum plants, for example, vacuum fusion apparatus, vacuum impregnating plants, etc. for mounting of such measuring devices of the usual types.

It is the general object of the present invention to provide a reliable vacuum measuring device which is suitable for the measurement of pressures which are smaller than $1 \times 10^{-3}$ mm. Hg, and particularly for the measurement of vacua in the pressure range of $1 \times 10^{-5}$ to $6 \times 10^{-5}$ mm. Hg.

It is a further object of the invention to construct a measuring device of the type indicated in such manner that, independently of the magnitude of the pressures to be measured, stable gas discharges occur, so that reliable measuring data are obtained.

It is a still further object of the invention to construct a vacuum measuring device which is capable of being operated with alternating current.

It is a further object of the invention to construct the cathodic electrodes which must be employed in combination with the gas discharge space so that their effectiveness is not reduced by the cathodic dispersion to which they are exposed in operation.

It is a further object of the present invention to eliminate the danger of interruption of the gas discharge at very low pressures, which interruption occurs by reason of the fact that at such very low pressures the gas discharge space is so impoverished with reference to the ions present therein that the required emission of electrons at the electrodes can no longer take place.

A further object of the invention is to construct a measuring device of the type indicated in such manner that a structural unit is provided which is completely screened against high tension, so that persons engaged in servicing such devices are completely protected against contact with high tension parts.

A further object of the invention is so to construct the magnets required for this type of device that a minimum of stray losses occur, as otherwise the danger arises that the magnetic stray field will cause leakages which, especially in connection with electronic microscopes, cathode ray oscillographs, etc., would be highly undesirable.

A further object of the invention is to provide a device of the type indicated wherein the required strong magnetic fields are produced with the smallest magnetic conducting losses so that it is possible to measure vacua lying below $1 \times 10^{-6}$ mm. Hg, such as have not been capable of measurement heretofore with the aid of the measuring principle described hereinafter because the discharge currents become too small for measurement.

It is a still further object of the invention to construct a measuring device which, while capable of attaining all of the above-described objectives, requires a minimum of space, which makes possible its disposition in all applications, and is handy and safe against contact, so that it possesses practically universal applicability.

Other objects and advantages of the invention will appear from the following detailed description thereof.

In the accompanying drawing, there is shown a vertical longitudinal section through a measuring device constructed in accordance with the invention.

The mechanism about to be described operates on the following measuring principle:

In a space in which prevails the vacuum to be measured, there is produced a gas discharge, and especially a glow discharge, by applying a tension of a few thousand volts to a pair of electrodes disposed in the vacuum space. The resulting electron and ion migration produces a current which is measured to determine the pressure in the space. With such a device, there can reliably be measured only pressures which are higher than $1 \times 10^{-3}$ mm. Hg.

In order to enlarge the measurement range, there have already been produced glow discharges whose path penetrates a magnetic field. Especially by dividing the cathode into two individual cathodes, any by arranging the anode between such two cathodes, the result has been obtained that the electrons emitted from one of the cathode parts with such electrode configuration are prevented by the magnetic field from travelling to the anode directly along the electrical lines of force. Under the influence of the magnetic field, the electrons are compelled to travel rather in the direction of the magnetic lines of force, so that the electrons perform a helical movement about the magnetic lines of force. This is referred to briefly as a "spooling" or "spiralling" of the electrons. If the electrons come into the vicinity of the second part of the cathode, their movement is braked and they are forced back; that is, they travel in the direction toward the first cathode part. The electrons thus migrate back and forth between the cathode parts until they are finally deflected to the anode under the action of the electrical field. In this way, it is possible to enlarge greatly the paths traversed by the electrons and thereby to increase extensively the probability of a collision with a gas molecule or current. Thus, not only is the ignition voltage of the discharge greatly reduced, but the discharge current is greatly increased, as the latter depends directly upon the number of impinged gas molecules and on their ionization. In this way, it is possible to measure vacua down to approximately $1 \times 10^{-5}$ mm. Hg.

The present invention is based upon the discovery that by the fundamental use of this measuring principle, pressures can be measured which are smaller than $1 \times 10^{-5}$ mm. Hg; and that it is also possible with the aid of this measuring principle to measure a pressure range which heretofore could not be reliably attained, namely, a range lying between $1 \times 10^{-5}$ and $6 \times 10^{-5}$ mm. Hg; and that it is further possible to measure vacua lying even below $1 \times 10^{-6}$ mm. Hg when care can be taken that the gas discharges remain stable also in these pressure ranges and are not interrupted, as has frequently occurred heretofore.

I have found that this goal is attainable if the electrode and magnet arrangement is completely rotation-symmetrical with respect to an axis connecting the pole shoes of the magnet. By such arrangement it becomes possible to stabilize the space charge and gas discharge itself at all pressures which come into consideration, and so thoroughly that these pressures become clearly measurable.

The invention is based upon the further discovery that this stabilization is so extensive that it is even possible to replace the heretofore necessary high tension direct current with alternating current, so that the economy of the measuring process is improved, and the construction of the measuring device can be confined to such a limited space that it can be employed even in those cases in which heretofore the known devices could not be utilized because of their excessive space requirements.

I have found further that by reason of the presence of oxygen, which is practically always present in the evacuation of vacuum chambers, there is afforded the possibility of constructing the cathodic electrodes, at least at their surfaces, of metals which form a non-conducting oxide during the cathode dispersion in the presence of oxygen. A suitable metal of this type is, for example, tantalum whose oxide ($Ta_2O_5$) is non-conducting. Obviously it is possible to employ in place of tantalum also other metals which likewise form suitable non-conducting oxides.

The invention is based upon the further discovery that the danger of breaking off of the gas discharge at very high vacua, that is, at pressures below $1 \times 10^{-6}$ mm. Hg can be eliminated by covering the electrodes with a radioactive material. The resulting ionization of the gas discharge space prevents too great an impoverishment thereof in ions, which on their part are absolutely necessary for the emission of electrons at the electrodes.

The invention rests finally upon the further discovery that by the use of hollow or pot magnets it is possible in the simplest manner to extend the rotation-symmetrical construction of the device also to the magnet, so that the possibility is created of constructing a pole shoe of the pot magnet as a connection to the evacuation space to be measured and to arrange the measuring cell containing the electrode configuration within the pot-shaped interior of the magnet. The pot magnet can simultaneously form the connection of the high tension transformer which delivers the high tension current required for the glow discharge, so that all parts form a structural unit which is completely screened with respect to the outside, so that the whole apparatus is safe against any dangerous contact.

Referring now to the drawing, the measuring device of the invention includes, first of all, the pot magnet 1 whose pole shoes 2 and 3 are formed as electrodes of a circuit by means of which a glow discharge at the electrodes is produced. The electrode 2 has a through bore, so that the connection to the evacuated chamber whose degree of vacuum is to be measured, can be established in this way.

Between the electrodes 2 and 3 there is disposed the annular central electrode 4 which is at a counter-potential with reference to the potential of the electrodes 2 and 3, which in general are formed as cathodes of the circuit, while the annular central electrode 4 forms the anode. The electrodes 2 and 3, and likewise electrode 4, as illustrated, are disposed rotation-symmetrically with reference to the central axis connecting the pole shoes of the magnet. Thus there results also the possibility of arranging rotation-symmetrically the head pieces 5 and 6 by means of which the pole shoes or electrodes 2, 3 are concealed. The head pieces 5, 6 consist of chemically inert materials. They are made especially of metals which form, with the always-present oxygen, a non-conducting stable oxide. They can, for example, be made of tantalum, as the resulting tantalum oxide is stable and non-conducting. The electrode configuration 2, 3, 4 is surrounded by an envelope 7 made of insulating material, such as glass, enclosing an evacuated space sealed against the atmosphere and forming the measuring cell which is supported at the pole shoes 2, 4. At 8 and 9 are disposed radioactive substances which act to ionize the gas discharge space inside of the measuring cell 7 and operate to prevent a too extensive impoverishment of this space in ions at very low pressures. At 10 is shown a high tension transformer which is connected directly to the magnet or forms with it or with the measuring cell 7 a structural unit which, as a whole, is completely screened from the exterior, so that attendants are protected against the high tension.

The use of a pot magnet has, in addition to space-saving feature, which is indicated particularly by the arrangeability of the measuring cell in the pot-shaped interior of the magnet, the advantage that a minimum of magnetic leakage loss occurs, so that the measuring device can be employed also in those situations where a magnetic leakage field would cause disturbances, as with electron microscopes and cathode ray oscillographs.

In addition, there is obtained a very strong magnetic field with a minimum of magnetic conducting loss, so that degrees of vacuum can be measured which are even less than $1 \times 10^{-6}$ mm. Hg.

The operation of the device is as follows:

The ions present in the gas discharge space inside of the insulating envelope or cell 7 are attracted to the surfaces of the pole shoes or electrodes 2, 5, or 3, 6 under the influence of the high tension generated in the transformer 10, and there produce electrons as result of the ionic impacts. These electrons migrate perpendicularly to the surface of the parts 2, 5 or 3, 6 in the direction of the magnetic lines of force, but after a short distance, are deflected by reason of the arrangement of the annular electrode 4, whereby the electrical fields of the electrons and the magnetic field of the magnet overlap to such an extent that the electrons traverse helical paths symmetrically to the axis of the magnet. In this way, the possibility of collision between the electrons with the molecules or atoms in the space inside of the envelope or cell 7 is greatly favored in contrast to the direct path between the electrodes 2, 5 and 3,6, and the probability of ionization is increased to such an extent that even the highest vacua below $10^{-6}$ mm. Hg become measurable. Even at pressures in the range between $1 \times 10^{-5}$ and $6 \times 10^{-5}$ mm. Hg, stable gas discharges are maintained, so that these vacua can consequently be clearly measured.

I claim:

1. A high vacuum measuring device comprising, an envelope enclosing a discharge space in which the vacuum to be measured prevails, two electrodes in said discharge space forming the pole shoes of a magnet, a third electrode disposed between said two pole shoe electrodes, said magnet and three electrodes being mounted rotation-symmetrically with respect to the axis connecting the pole shoes, said third electrode and magnet being electrically insulated with respect to each other, and a source of electric potential in circuit with said electrodes, said potential source adapted to produce a glow discharge at said electrodes whereby the current flowing in said circuit serves as a measure of the vacuum prevailing in said discharge space.

2. A high vacuum measuring device comprising, in combination, an envelope enclosing a discharge space in which the vacuum to be measured prevails, a two-part cathode in said discharge space, said cathode being formed as the pole shoes of a magnet, the surface of said pole shoes inside the discharge space consisting of a metal which on cathodic dispersion in the presence of oxygen forms a non-conducting oxide, an anode mounted between the cathodes, the magnet and the three electrodes being mounted rotation-symmetrically with respect to the axis connecting the pole shoes, said anode and magnet being electrically insulated with respect to each other, and a source of electric potential in circuit with said electrodes, said potential source adapted to produce a glow discharge at said electrodes whereby the current flowing in said circuit serves as a measure of the vacuum prevailing in said discharge space.

3. A device as defined in claim 2, wherein the said metal is tantalum.

4. A device as defined in claim 2, wherein one of the pole shoe and electrode structures is provided with a through bore adapted to form the connection with the chamber whose degree of vacuum is to be measured.

5. A device as defined in claim 4, wherein the magnet is in the form of a pot electromagnet, said device including a measuring cell disposed in the interior of the pot magnet and made of insulating material and containing said electrodes, said cell being supported by the pole shoes.

References Cited in the file of this patent

UNITED STATES PATENTS

| | | |
|---|---|---|
| 1,298,490 | Fuller | Mar. 25, 1919 |
| 2,135,006 | Jurriaanse | Nov. 1, 1938 |
| 2,217,187 | Smith | Oct. 8, 1940 |
| 2,304,412 | Kern et al. | Dec. 8, 1942 |
| 2,352,657 | Potts | July 5, 1944 |
| 2,473,826 | Smith | June 21, 1949 |
| 2,516,704 | Kohl | July 25, 1950 |

FOREIGN PATENTS

| | | |
|---|---|---|
| 147,856 | Great Britain | Jan. 9, 1922 |
| 245,755 | Great Britain | Nov. 4, 1926 |